(12) United States Patent
Grubb et al.

(10) Patent No.: US 9,724,790 B2
(45) Date of Patent: Aug. 8, 2017

(54) SYSTEMS AND METHODS FOR CANISTER INSPECTION, PREPARATION, AND MAINTENANCE

(71) Applicant: AREVA Inc., Lynchburg, VA (US)

(72) Inventors: Robert Grubb, Mesa, AZ (US); Aleksandr Kofman, Rockville, MD (US)

(73) Assignee: TN Americas LLC, Columbia, MD (US)

( * ) Notice: Subject to any disclaimer, the term of this patent is extended or adjusted under 35 U.S.C. 154(b) by 0 days.

(21) Appl. No.: 13/758,813

(22) Filed: Feb. 4, 2013

(65) Prior Publication Data

US 2013/0340225 A1    Dec. 26, 2013

Related U.S. Application Data

(60) Provisional application No. 61/663,427, filed on Jun. 22, 2012.

(51) Int. Cl.
| | |
|---|---|
| *B23P 6/00* | (2006.01) |
| *G21F 5/008* | (2006.01) |
| *G21F 5/06* | (2006.01) |
| *G21F 5/14* | (2006.01) |

(52) U.S. Cl.
CPC ............... *B23P 6/00* (2013.01); *G21F 5/008* (2013.01); *G21F 5/065* (2013.01); *G21F 5/14* (2013.01); *Y10T 29/49* (2015.01); *Y10T 29/49718* (2015.01); *Y10T 29/49764* (2015.01); *Y10T 29/51* (2015.01)

(58) Field of Classification Search
CPC .... G21F 1/04; G21F 5/00–5/008; G21F 5/06; G21F 5/065; G21F 5/14; B23P 6/00; B23P 6/04; B23P 23/04; Y10T 29/49718; Y10T 29/49764; Y10T 29/49769; Y10T 29/49771; Y10T 29/49773; Y10T 29/5176
USPC ............. 29/402.01, 407.01, 407.04, 407.05, 29/407.06, 56.5, 705, 723, 281.6; 376/272; 250/505.1, 506.01; 588/1, 16
See application file for complete search history.

(56) References Cited

U.S. PATENT DOCUMENTS

| | | | |
|---|---|---|---|
| 4,677,274 A | * | 6/1987 | Bisiach .................... 219/121.79 |
| 6,296,395 B1 | * | 10/2001 | Brand et al. .................. 384/558 |
| 6,718,000 B2 | | 4/2004 | Singh |

(Continued)

FOREIGN PATENT DOCUMENTS

| | | |
|---|---|---|
| JP | 62-38356 A | 2/1987 |
| JP | 64-75995 A | 3/1989 |

(Continued)

OTHER PUBLICATIONS

Machine translation of JP10082896A.*

(Continued)

*Primary Examiner* — Christopher Besler
*Assistant Examiner* — Matthew P Travers
(74) *Attorney, Agent, or Firm* — Christensen O'Connor Johnson Kindness PLLC

(57) ABSTRACT

A travel system (20) for a canister storage, transfer, or transport system generally includes a support structure (22), at least one traveling device (24) for preparing, inspecting, and/or repairing the canister, and a base ring (26) for supporting the traveling device and providing for rotational movement of the traveling device relative to the support structure.

18 Claims, 12 Drawing Sheets

(56) References Cited

U.S. PATENT DOCUMENTS

| | | |
|---|---|---|
| 6,793,450 B2 | 9/2004 | Singh |
| 6,949,005 B1* | 9/2005 | Larsen et al. .................. 451/5 |
| 2006/0188054 A1 | 8/2006 | Pennington |
| 2008/0207977 A1* | 8/2008 | Peterson ............. G21F 9/165 588/3 |
| 2009/0309918 A1* | 12/2009 | Yoshida et al. ............ 347/30 |
| 2014/0221721 A1* | 8/2014 | Bermudez et al. ......... 588/16 |

FOREIGN PATENT DOCUMENTS

| | | |
|---|---|---|
| JP | 07-253497 A | 10/1995 |
| JP | 8-262181 A | 10/1996 |
| JP | 10-82896 A | 3/1998 |
| JP | 2004-226385 A | 8/2004 |

OTHER PUBLICATIONS

International Search Report and Written Opinion mailed May 15, 2013, issued in corresponding International Application No. PCT/US2013/024660, filed Feb. 4, 2013, 7 pages.

United Kingdom Combined Search and Examination Report mailed Jan. 3, 2014, issued in corresponding United Kingdom Application No. GB1302571.3, filed Feb. 14, 2013, 6 pages.

International Preliminary Report on Patentability and WrittenOpinion mailed Dec. 23, 2014, issued in corresponding International Application No. PCT/US2013/024660, filed Feb. 4, 2013, 5 pages.

* cited by examiner

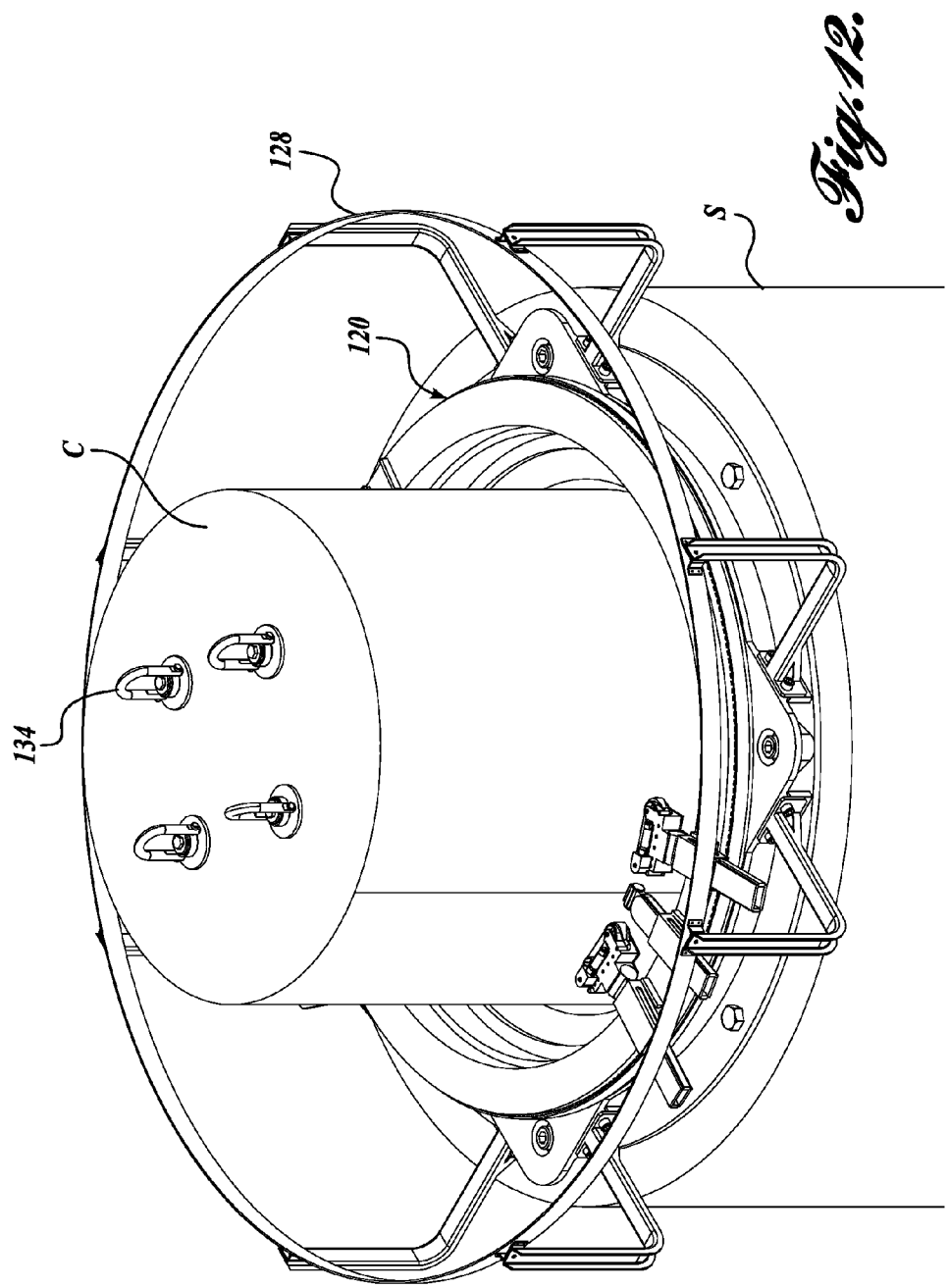

SYSTEMS AND METHODS FOR CANISTER INSPECTION, PREPARATION, AND MAINTENANCE

CROSS-REFERENCE TO RELATED APPLICATION

This application claims the benefit of U.S. Provisional Application No. 61/663,427, filed Jun. 22, 2012, the disclosure of which is expressly incorporated by reference herein in its entirety.

BACKGROUND

With the prospect of radioactive material remaining in storage at reactor sites longer than was originally anticipated, there is a need to verify the condition of the canister shell, which forms the primary boundary for confinement of radioactive materials in ventilated canister storage systems. The need for inspection is particularly important at coastal storage facilities, where stress corrosion cracking of stainless steel canisters may be a concern. Depending on the results of the inspection, maintenance may also be necessary.

Therefore, there exists a need for delivering various non-destructive examination and maintenance tools, which can be mounted between the storage module and the transfer cask in a storage system.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a travel system for a canister storage, transfer, or transport system is provided. The travel system generally includes a support structure, at least one traveling device for preparing, inspecting, and/or repairing the canister, and a base ring for supporting the traveling device and providing for rotational movement of the traveling device relative to the support structure.

In accordance with another embodiment of the present disclosure, a travel system for a canister storage, transfer, or transport system is provided. The travel system generally includes a support structure couplable to the canister storage, transfer, or transport system, at least one traveling device selected from the group consisting of a sensing device, a preparation device, and a repair device, and a base ring for supporting the at least one traveling device and providing for rotational movement of the traveling device relative to the support structure.

In accordance with another embodiment of the present disclosure, a method of preparing, inspecting, and/or repairing a canister in a canister storage, transfer, or transport system is provided. The method generally includes mounting a travel system on a canister storage, transfer, or transport system, wherein the travel system includes a support structure, at least one traveling device, and a base ring for supporting the traveling device and providing for rotational movement of the traveling device relative to the support structure. The method further includes rotating the base ring and the traveling device relative to the support structure or moving the canister relative to a fixed base ring and traveling device.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIGS. 9-12 are various views of a vertical dry storage module for containing a canister and having a travel system positioned at the opening of the module in accordance with another embodiment of the present disclosure.

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Figure 1:
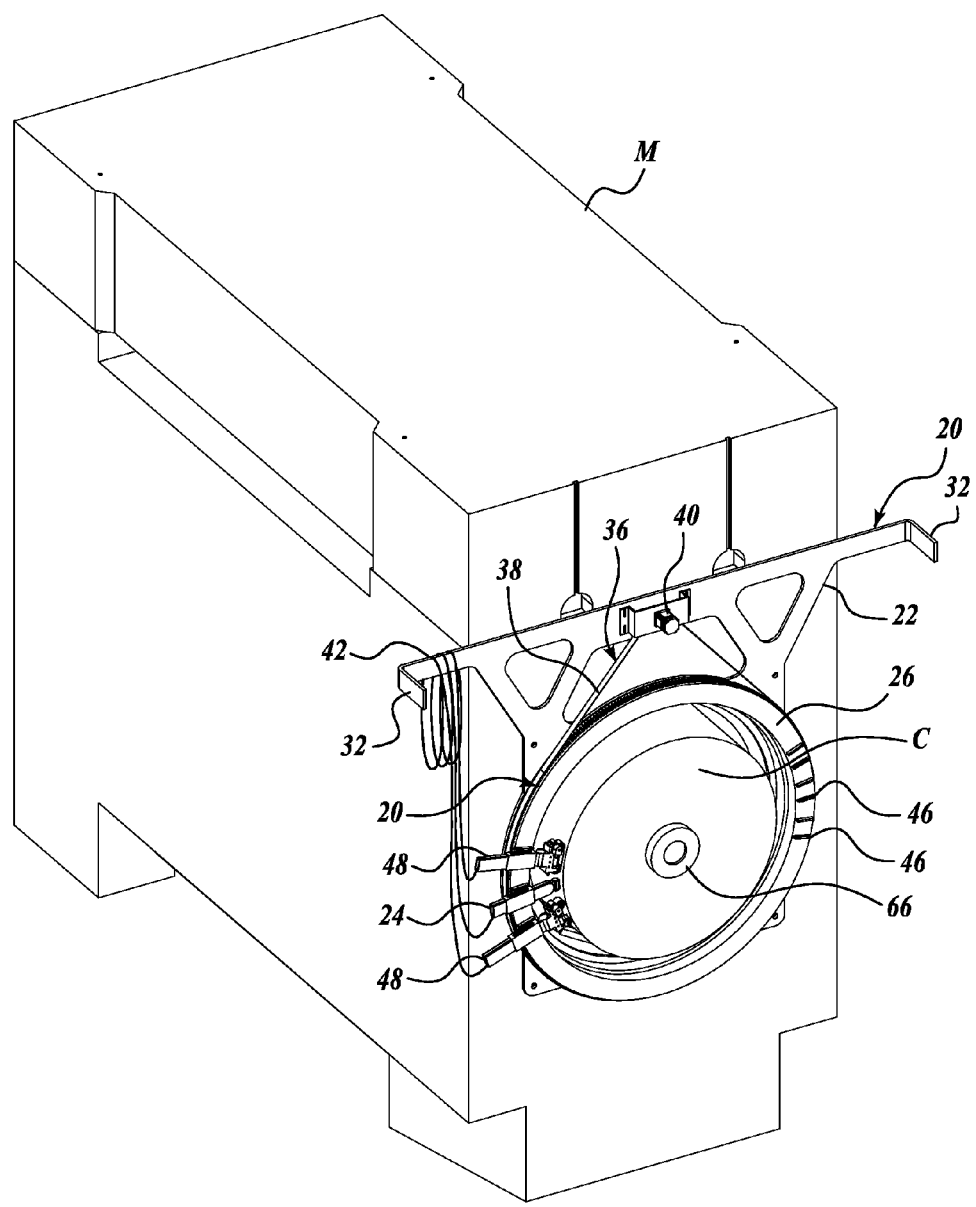
FIG. 1 is an isometric view of a horizontal dry storage module for containing a canister and having a travel system for canister inspection, preparation, and/or repaired positioned at the opening of the module in accordance with one embodiment of the present disclosure.

Embodiments of the present disclosure are generally directed to systems, devices, and methods for inspecting canisters designed for containing radioactive material for abnormalities, for example, for stress corrosion cracking, and for providing maintenance where needed. Referring to FIG. 1, a horizontal dry storage module M for a canister C is shown that has its front door removed so that the canister C may be moved in and out of the module M. A travel system 20 is attached to the module M and is designed for traveling along external surfaces of the canister C for preparation, inspection, and/or repair of the external surfaces that cannot be manually affected because of the canister's radiation field.

The travel system 20 may be configured to prepare, examine, and/or repair any of the external surfaces of the canister C, but also may have a particular focus on welds and other surfaces subject to degradation. Preparation, examination, and maintenance of a canister C using the travel system 20 can prepare the canister C for transport, for example, after an extended period of storage, or for extended storage.

Although shown in FIGS. 1-8 as being used on a horizontal storage module M, it should be appreciated that canister travel systems 20 may also be used in vertical storage systems, for example, including vertical storage silos. As described in detail below, FIGS. 9-12 represent one embodiment of a vertical storage system. The travel system 20 may be mounted between a storage over pack (for example, a horizontal storage module M, as can be seen in FIG. 1, or a vertical storage silo S, as can be seen in FIG. 9) and a cask (for example, a transfer cask or a transportation cask, not shown). In that regard, the external surfaces of the canister C may be prepared, examined, and/or repaired during the canister C transfer process, for example, as the canister is withdrawn from the over pack into the cask, as it is being inserted into the over pack from the cask, or both.

Returning to FIG. 1, the travel system 20 generally includes a support structure 22, at least one traveling device (for example, a sensing device 24), and a base ring 26 for supporting the sensing device 24 relative to the support structure 22. It should be appreciated, however, that the travel system 20 may also be designed to support preparation and maintenance tools, in addition to sensing tools. As described in greater detail below, the travel system 20 may move relative to the canister C (see e.g., FIG. 8), or in the alternative, the canister C may move relative to the travel system 20 (see e.g., FIG. 5).

Figure 2:
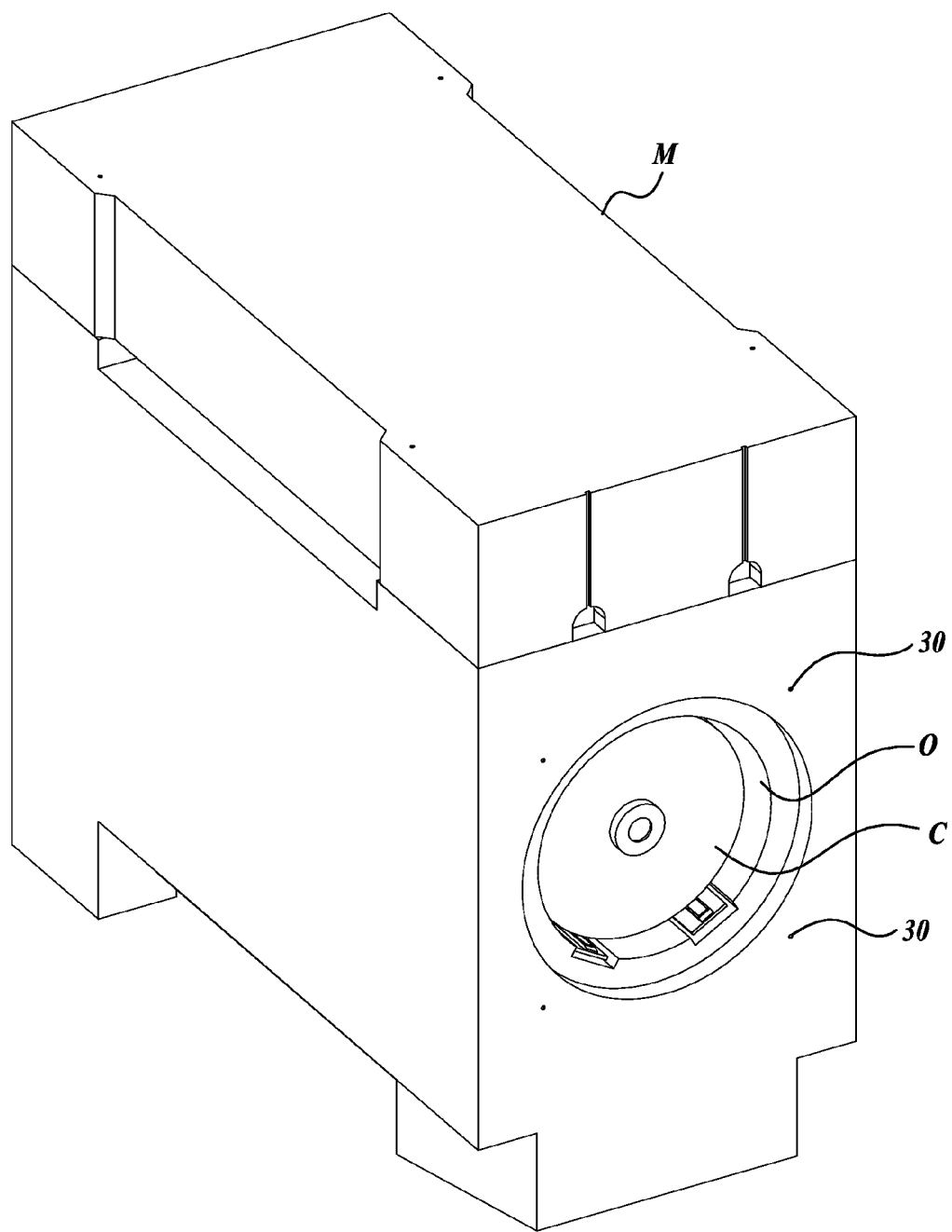
FIG. 2 is an isometric view of a horizontal dry storage module for containing a canister shown in FIG. 1 with the canister travel system shown in FIG. 1 removed from the opening of the module.
Figure 3:
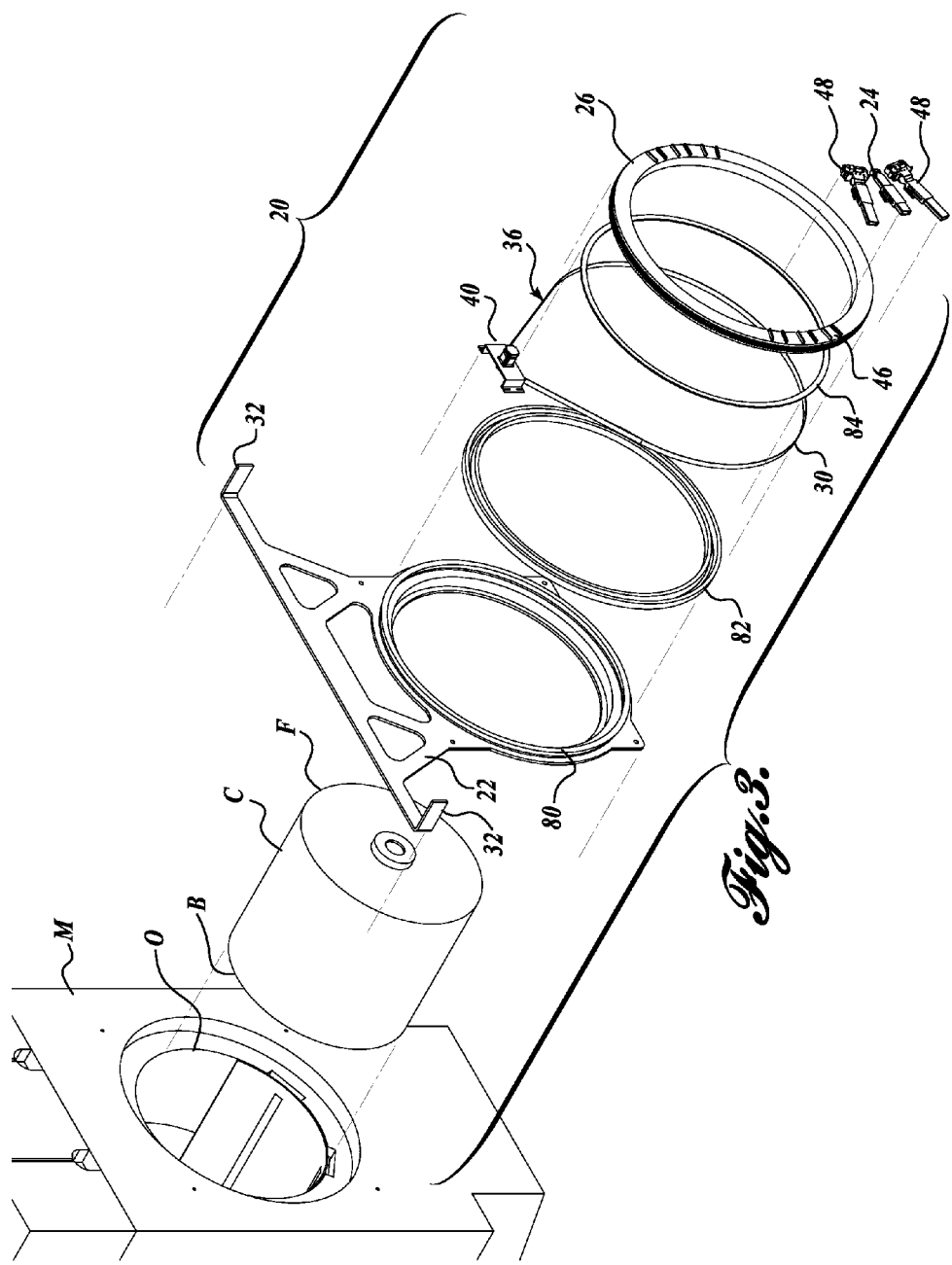
FIG. 3 is an exploded view of the canister travel system shown in FIG. 1.

Comparing FIGS. 2 and 3, the support structure 22 may be attached to the entry point of the module M by using the same embedments 30 that are used for door installation. In that regard, fasteners may be used to couple with embedments 30 that are provided for door attachment. The support structure 22 is therefore designed for repeatable and precise installation on the module M. In addition, the support structure 22 is easy to attach to and remove from the module M and is configured to operate in the limiting space of opening between the module M and the transfer equipment (not shown). Arms 32 extending outwardly from the support structure 22 can be used to support control and power cables 42 (see FIG. 1).

Figure 4:
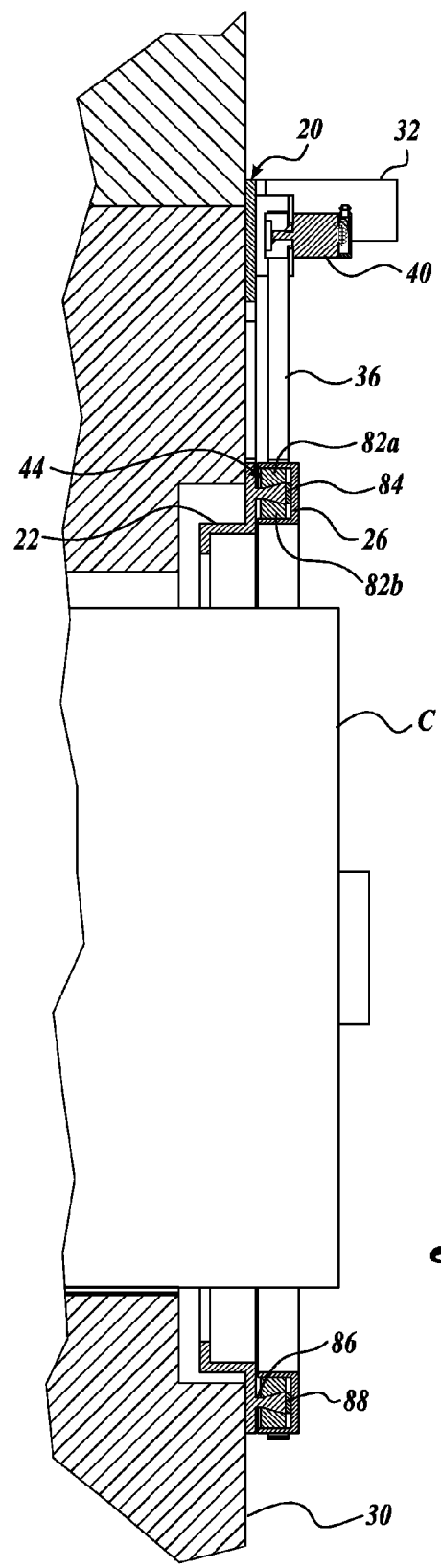
FIG. 4 is a side cross-sectional view of the travel system shown in FIG. 1.

Referring to FIGS. 3 and 4, the components of the travel system 20 will now be described in greater detail. The base ring 26 is coupled to the support structure 22 and as shown in the illustrated embodiment, may be configured for rotational movement relative to the support structure 22. Referring to FIG. 3, the base ring 26 is rotatably mountable on the support structure 22 to align and be concentric with an opening O into the module M, in which the canister C is inserted and contained. The base ring 26 may be configured to rotate either clockwise or counterclockwise, or both (e.g., to oscillate between clockwise and counterclockwise).

The base ring 26 may be actuatable for precise and repeatable movements relative to the support structure 22. In the illustrated embodiment of FIG. 3, an actuation assembly 36 includes a precision timing belt 38, which may be driven by a stepper motor 40. The advantage of using a timing belt 38 and stepper motor 40 for actuation is that locations of, for example, defects, can be pinpointed using software coordinates. It should be appreciated, however, that other actuation assemblies are also within the scope of the present disclosure. For example, transmissions for rotation may include one or more gears, sprockets, chains, or one or more timing belts (for example, one timing belt used as a gear and one to transmit motion). Actuation assemblies in accordance with embodiments of the present disclosure may be designed to prevent slippage.

A bearing system 44 allows the base ring 26 to move relative to the support structure 22. In the illustrated embodiment, the base ring 26 of the illustrated embodiment has a groove, which is shown in the cross-sectional view of FIG. 4 as a cup-shaped design. The groove is configured to interface with the bearing assembly 44 and the support structure 22. In that regard, the bearing assembly 44 allows the base ring 26 to rotate without constraint relative to the support structure 22 while carrying the load of the base ring 26 itself and prevent radial or linear movement of the base ring 26 relative to the support structure 22.

Referring to FIGS. 3 and 4, the bearing assembly 44 includes a guide ring 80 extending from the support structure 22, an external bearing ring assembly 82 that is positioned external to the guide ring 80, and an internal bearing ring assembly 84 to interface with the guide ring 80. As can be seen in the cross-sectional view of FIG. 4, the guide ring 44 extending from the support structure 22 has a first end 86 coupled to the support structure 22 and a second end 88 distal from the support structure 22. From the first end 86 to the second end 88, the cross-sectional shape of the guide ring 44 expands such that it has a larger width as the second end 88 than at the first end 86.

The external bearing ring assembly 82 includes outer and inner components 82a and 82b that are designed to interface as bearing surfaces between the surfaces of the guide ring 80 and the surfaces of the base ring groove. In that regard, the outer and inner components 82a and 82b have trapezoidal cross-sectional shapes to interface with the cross-sectional shape of the guide ring 44. The internal bearing ring 84 provides a bearing surface between the second end 88 of the guide ring 80 and the inner surface of the groove.

The bearing surfaces of the external bearing ring assembly 82 (82a and 82b) and the internal bearing ring 84 allow the base ring 26 to rotate relative to the support structure 22. In addition, in this horizontal orientation, the external bearing ring assembly 82 (82a and 82b) carries the load of the base ring 26 itself. The fit of the bearing assembly 44 components allows for rotation movement of the base ring 26 relative to the support structure 22, but prevents radial or linear movement of the base ring 26 relative to the support structure 22.

Referring to FIG. 2, the base ring 26 is configured to have "pockets" or specific mounting positions 46 for its payloads, which may include one or more sensing devices 24 or preparation devices 48. As a non-limiting example, the mounting positions 46 may be rigidly attached to the base ring 26 to receive either rigidly mountable or removable sensors. In the illustrated embodiment of FIG. 4, the mounting positions 46 are radially spaced from one another along the base ring 26 and include a receiving portion for receiving any number of inspection, preparation, and maintenance tools necessary for a particular operation, for example, a mountable sensing device 24 or a preparation device 48.

The mounting positions 46 can also be configured to hold other mountable devices, including, but not limited to, grinders, welding heads, peening nozzles, abrasive blast nozzles, surface coating spray nozzles, surface cleaning spray nozzles, or other devices needed to repair surface defects, to clean the surface, or to provide preventative maintenance such as surface coating for extended storage.

Mounting positions 46 may be located at multiple positions along the base ring 26. For example, in one embodiment of the present disclosure, the base ring 26 may include mounting positions 46 at two sides of the base ring 26 so that 180 degree rotation of the base ring 26 can be configured to provide 360 degrees of surface coverage. Reducing the degrees of rotation required for the base ring 26 to cover the entire surface may provide advantages in terms of management of cables, to the travel system 20, such as power, controls, compressed gas, etc.

Figure 5:
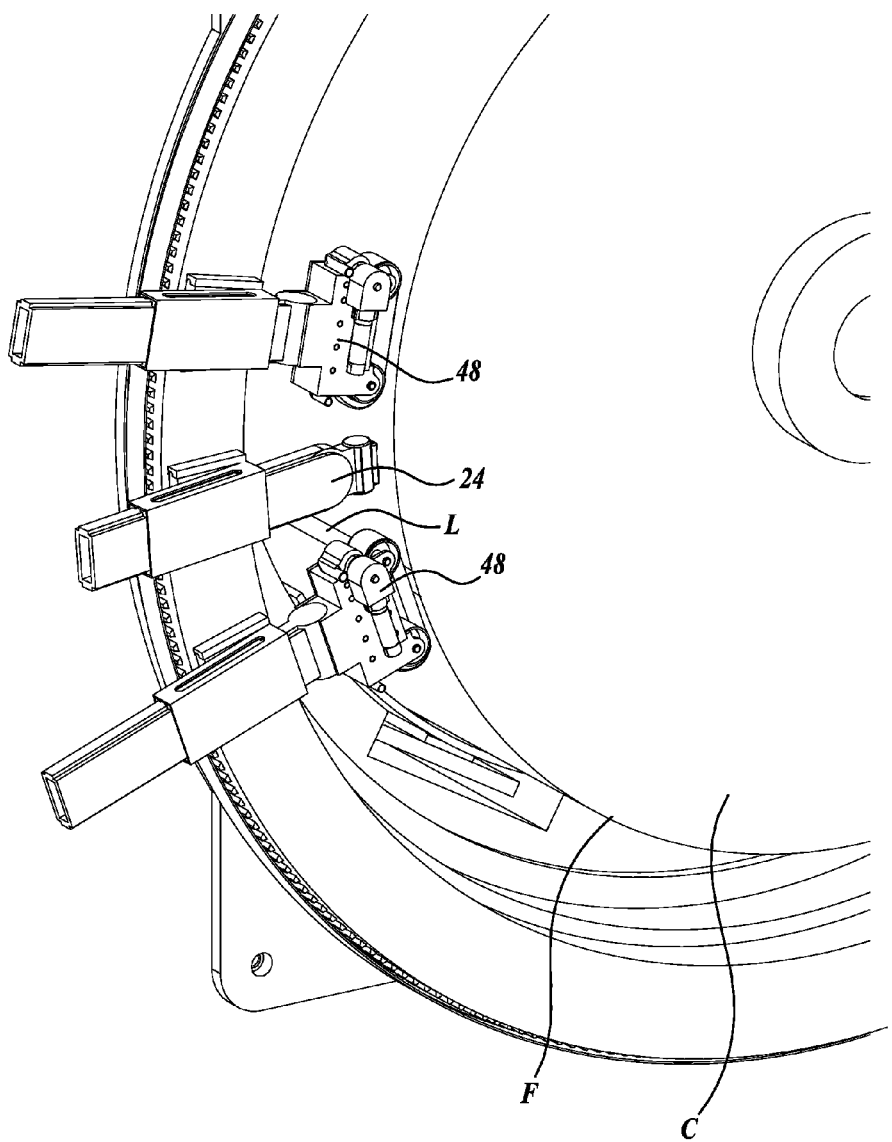
FIG. 5 is a perspective view of a longitudinal weld inspection and/or maintenance process.

In the illustrated embodiment of FIG. 5, a sensing device 24 is mounted between two preparation devices 48 to allow for two-way scanning, for example, in either of the clockwise and counterclockwise directions. The preparation devices 48 may be used to either clean the surface before inspection or apply a solution needed for inspection (for example, in ultrasonic and penetration testing). By mounting a single sensing device 24 between two preparation devices 48, preparation may be achieved before sensing if the base ring 26 is moving in either a clockwise or counterclockwise direction. Moreover, by mounting a single sensing device 24 between two preparation devices 48, the first device 48 can be used to apply a solution needed for inspection, and the second device 48 can be used to remove the solution after testing.

Figure 6:
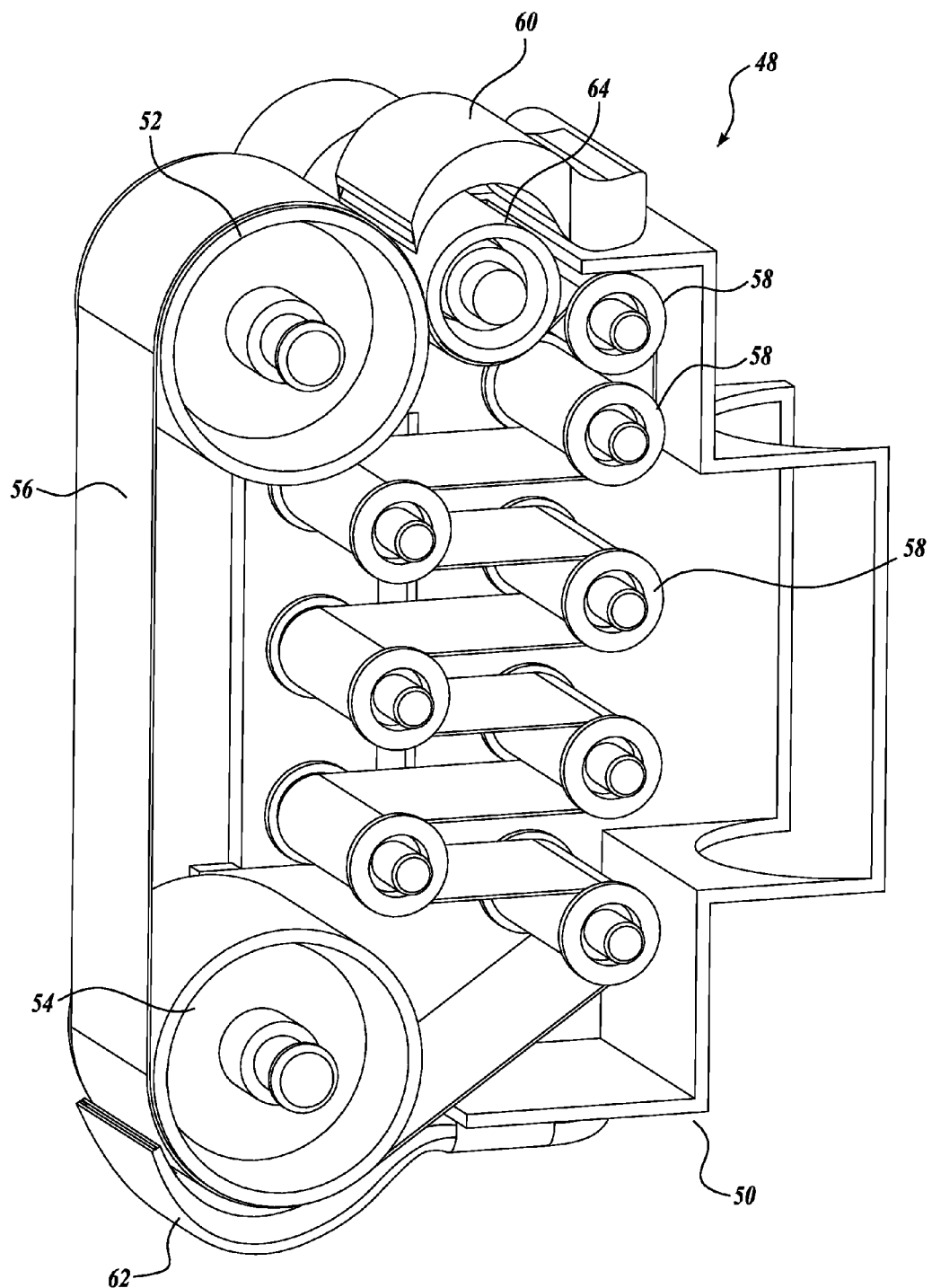
FIG. 6 is a close-up isometric view of a preparation device used in the canister inspection and/or maintenance system shown in FIG. 1.

Referring to FIG. 6, an exemplary preparation device 48 is provided. The preparation device 48 includes a body 50 having first and second main rollers 52 and 54 and a tape 56 that travels between the first and second main rollers 52 and 54. The preparation device 48 may further include one or more smaller return rollers 58 that are configured to tension the tape 56, taking up any slack in the tape 56 on its return. In another configuration, however, the preparation device 48 may not include return rollers; rather, the first main roller 52 may be a supply roller and the second main roller may be a take-up roller, similar to an audio cassette tape. In the illustrated embodiment, the plurality of return rollers are included to allow for a long tape 56, so as to minimize tape changes in the process, as well as any take up problems in the device 48. One or both of the main rollers 52 and 54 may be driven, for example, by a drive roller 64, an air motor having a gear head, or by any other suitable driving mechanism.

If the preparation device 48 is being used as a cleaning device, the tape 56 may be any type of cleaning media, for example, including but not limited to cloth, abrasive pads, felt, etc., and may depend on the required cleaning application. The spread of the first and second main rollers 52 and 54 shall be sufficient to allow the span of tape 56 between the rollers 52 and 54 to cover a flat surface on the canister C, but also to conform to the curvature of the canister C, for example, when running over either a front or back end welding seam. It should be appreciated, however, that other preparation and cleaning devices besides use of a tape and roller mechanism are also within the scope of the present disclosure.

If the preparation device 48 is being used as a solution delivery system, the tape 56 may be any suitable media for delivering solution. The preparation device 48 may also include a delivery nozzle 60, which may be configured to deliver a solution to the surface of the canister C, and a suction nozzle 62 to provide evacuation of the delivered solution.

Figure 7:
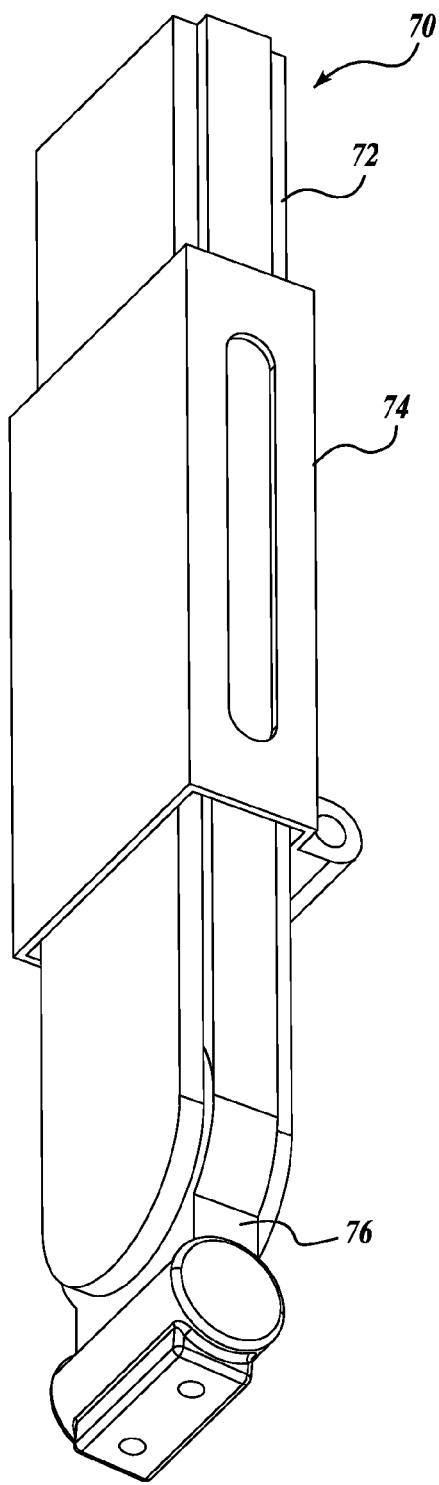
FIG. 7 is a close-up isometric view of a sensing device assembly used in the canister inspection and/or maintenance system shown in FIG. 1.

The sensing device 24 may be mounted to the base ring 26 with multiple degrees of movement freedom to achieve an optimal sensing position. Referring to FIG. 7, an exemplary sensing device 24 is mounted on a tool arm assembly 70. The sensing device 24 may be mounted to have multiple degrees of freedom relative to the canister C surface that it is sensing. For example, the arm 72 is slidable within an arm casing 74 to allow the sensing device to move forward and back relative to the base ring 26 and the canister C surface. Moreover, the sensing device 24 is mounted on a moveable neck 76 that is capable of radial rotation relative to the arm 72. The preparation device 48 may be mounted on a similar arm assembly. Further, the arm casing 74 is pivotably mounted to the pockets 46 (see FIG. 5 to provide for pivotal rotation relative to the pocket 46).

The purpose of the sensing device 24 is to inspect canisters welds and surfaces, for example, during transition of the canister C between its storage over pack module M and a transfer cask or a transportation cask (not shown). This extraction could occur at any time during the storage, transfer, or transportation of the canister C. Examination or sensing methods are primarily aimed at examining canisters to discover imperfections in the outer canister wall, including, but not limited to, pitting corrosion, rust discoloration, and/or stress corrosion cracking in weld and heat-affected zones.

Suitable sensing devices may include non-destructive testing devices, such as dye penetrant sensors, ultrasonic examination sensors, eddy current examination sensors, laser ultrasonic examination sensors, and/or visual inspection sensors. The sensing devices used may vary depending on the quality and quantity of sediments on the surfaces of the canisters C, and the size and orientation of imperfections. In the case of ultrasonic and penetration testing, solutions may need to be applied before the testing and evacuated after the testing. Therefore, embodiments of the present disclosure further include cleaning heads that can be used to clean and/or apply and evacuate solutions.

Eddy current examination uses eddy currents, which are electric currents induced in conductors when a conductor is exposed to a changing magnetic field due to variations of the field with time. The changing magnetic field can cause a circulating flow of electrons, or current, within the body of the conductor. Eddy current sensors are generally capable of discovering stress corrosion cracking on smooth surfaces, such as mill-finish plate or flush-ground welds. The eddy current testing generally includes tools for visual inspection, surface cleaning, and manipulation of the eddy current probe.

Dye penetrant testing uses a penetrant and developer solution to penetrate cracks and highlight surface defects. Penetrant testing is generally capable of discovering stress corrosion cracking. The procedure is typically performed as a manual procedure; however, it can be automated using spray nozzles, wipers, and/or fiber optics to clean the surface, apply the penetrant, wipe off excess penetrant, apply the developer, and visually inspect the surface. In that regard, dye penetrant testing generally includes a camera or fiber optic probe with lighting for visual inspection, surface cleaning, application of penetrant, and application of developer.

In ultrasonic examination, very short ultrasonic pulse-waves with center frequencies ranging from 0.1-15 MHz and occasionally up to 50 MHz are launched into the canister wall or weld to detect internal flaws or to characterize materials. The technique is also commonly used to determine the thickness of the test object, for example, to monitor pipe work corrosion. Ultrasonic testing is often performed on steel and other metals and alloys, though it can also be used on concrete, wood and composites, albeit with less resolution. In ultrasonic testing, an ultrasound transducer connected to a diagnostic machine is passed over the object being inspected. The transducer is typically separated from the test object by a couplant (such as oil) or by water, as in immersion testing. Ultrasonic examination techniques are specifically designed to locate and size near-side defects. Ultrasonic examination generally includes tools for visual inspection, surface cleaning, application of couplant, and manipulation of the ultrasonic probe.

Laser-ultrasonic examination uses lasers to generate and detect ultrasonic waves. It is a non-contact technique used to measure materials thickness, detect flaws and materials characterization. The basic components of a laser-ultrasonic system are a generation laser, a detection laser and a detector. Laser ultrasonic examination generally includes tools for visual inspection, surface cleaning, and manipulation of the laser ultrasonic probe.

Visual inspection generally includes using special illumination and magnification techniques generally capable of discovering pitting and rusting that are precursors to stress corrosion cracking. Visual inspection may also include surface cleaning and/or testing.

Suitable maintenance devices may include surface cleaning, for example, by dry ice blasting, repairing cracked welds, and applications of protective coatings. A dry ice blasting process may include spray nozzles to apply dry ice and filtered waste evacuation to collect material removed from the canister C surface. A repair for cracked welds process may include a grinding head, weld heat, and one or more visual inspection tools. An application of protective coatings process may include one or more spray nozzles and visual inspection tools.

Returning now to FIG. 1, a front weld inspection will be described in greater detail. The front weld F is the circular weld between the front closure portion of the container C and the cylindrical sidewall of the container C. The front weld F can be inspected by pulling the canister C slightly forward in the module M (for example, using grappler ring 66) such that the travel system 20 is generally aligned with the canister C front weld F, as can be confirmed by operator visual inspection or by a sensing device. After canister C adjustment, the sensing device 24 and preparation devices 48 can be finely articulated and adjusted to meet the front weld F on the canister C using, for example, articulation controls.

After adjustment, the actuation assembly 36 can be used to rotate the base ring 26 (on which the exemplary sensing device 24 and preparation devices 48 are mounted) relative to the canister C around the entirety of the front weld F. Depending on the sensor used by the sensing device 24, the preparation devices 48 may clean the front weld F surface before sensing or they may apply and remove a solution necessary for inspection. As discussed above, the travel system 20 may also support repair tools, in addition to preparation and examination tools, for the front weld F in any suitable combination.

Referring now to FIG. 5, a longitudinal weld inspection will be described. The longitudinal weld L is the straight weld between the front closure portion of the container C and the back closure portion of the container C. The longitudinal weld L can be inspected by pulling the canister C slightly forward in the module M such that the travel system 20 is generally aligned with the canister C longitudinal weld L, as can be confirmed by operator visual inspection or by a sensing device. After canister C adjustment, the sensing device 24 and preparation devices 48 can be finely articulated and adjusted to meet the longitudinal weld L on the canister C using, for example, articulation controls.

In the illustrated embodiment of FIG. 5, a preparation device 48 has been adjusted to meet the longitudinal weld L on the canister C. The canister C can be pulled forward (for example, using grappler ring 66) from the module M as the sensing device 24 or preparation device 48 runs along the length of the longitudinal weld L. It should also be appreciated that the canister C may also be moved relative to the travel system 20 in the reverse direction. This action can be repeated as needed for further sensing, preparation, or clean-up, for example, to remove a solution necessary for inspection. As discussed above, the travel system 20 may also support repair tools, in addition to preparation and examination tools, for the longitudinal weld L in any suitable combination.

Figure 8:
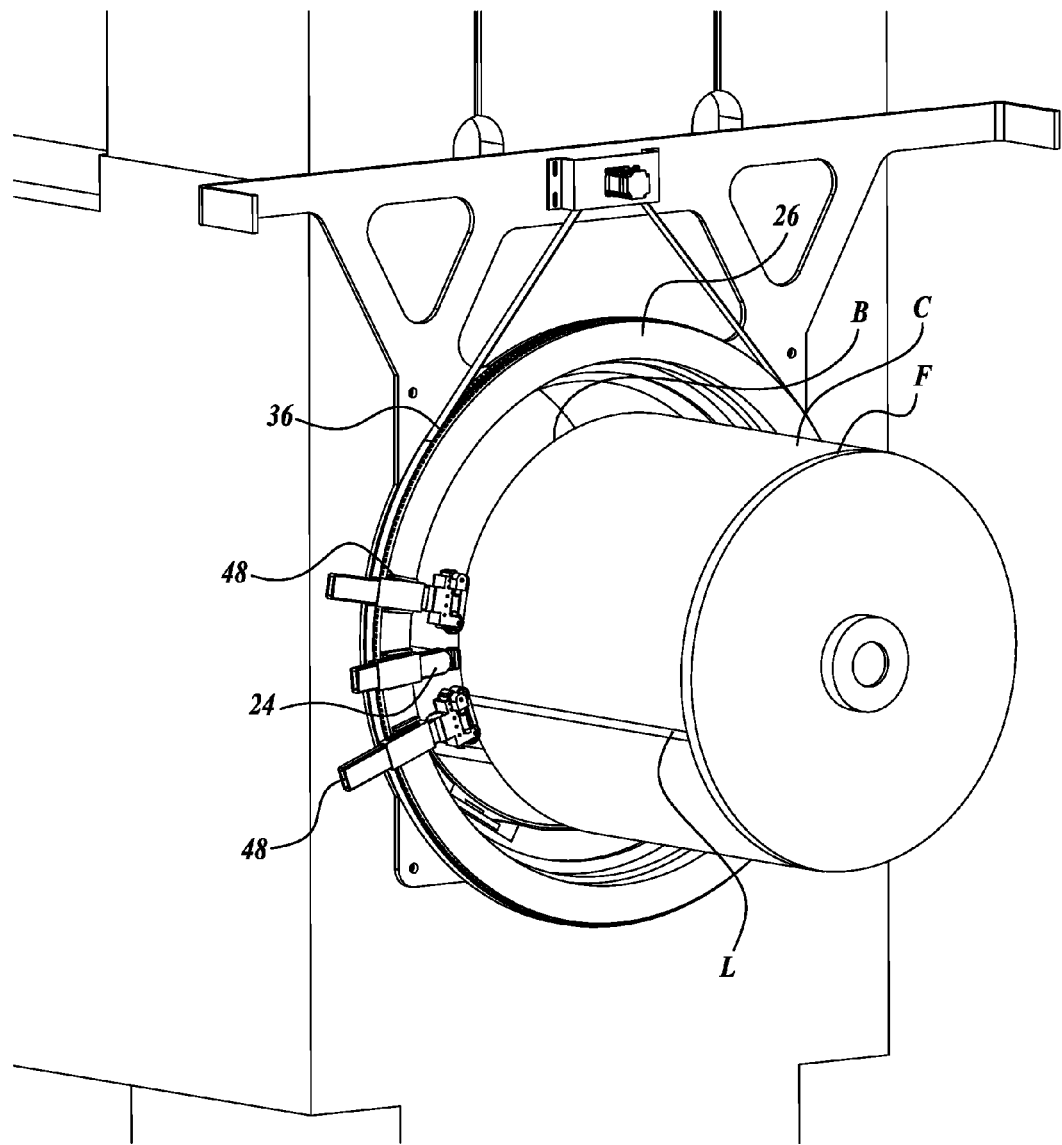
FIG. 8 is a perspective view of a longitudinal weld inspection and/or maintenance process.
Figure 9:
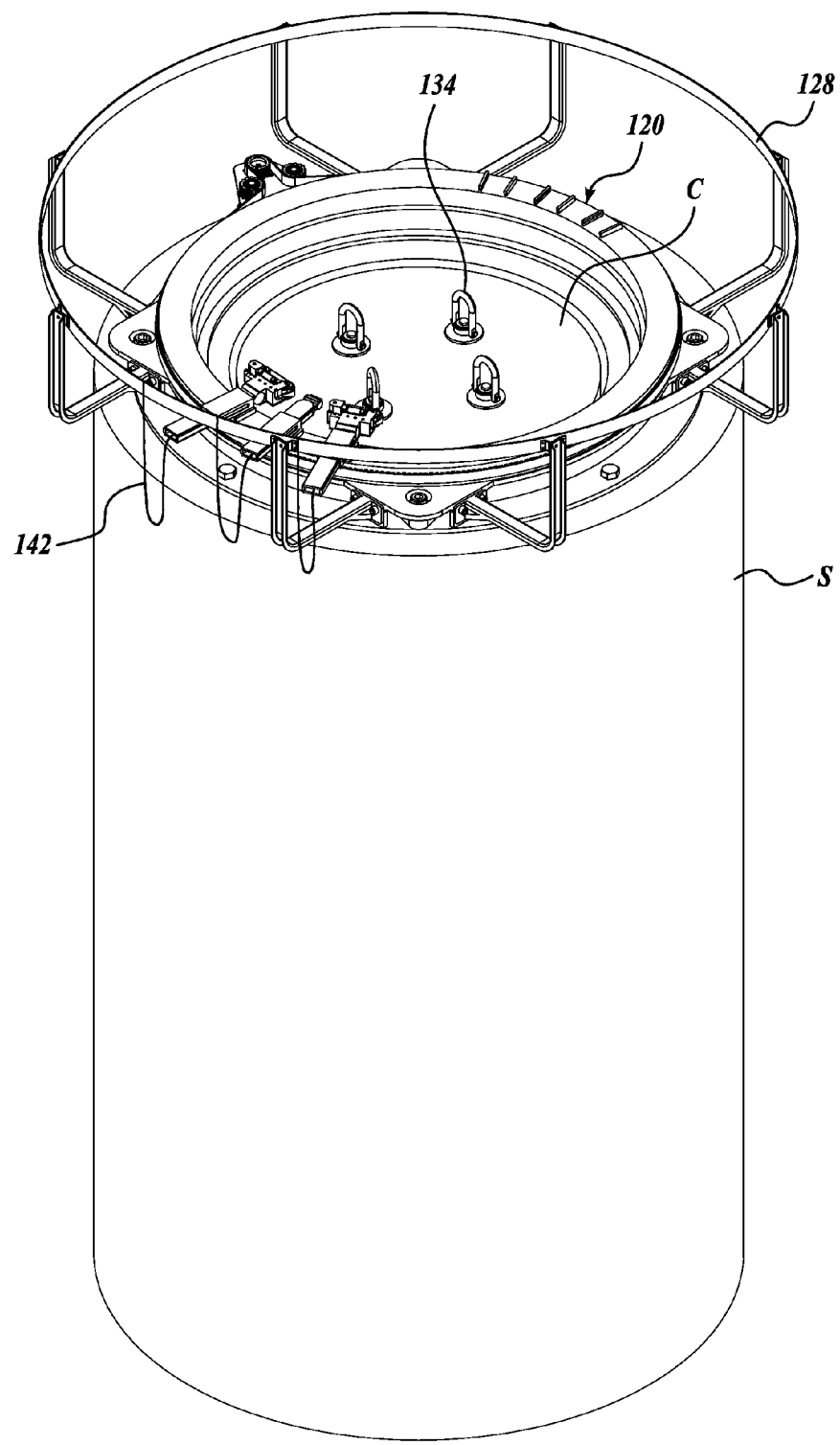
Figure 10:
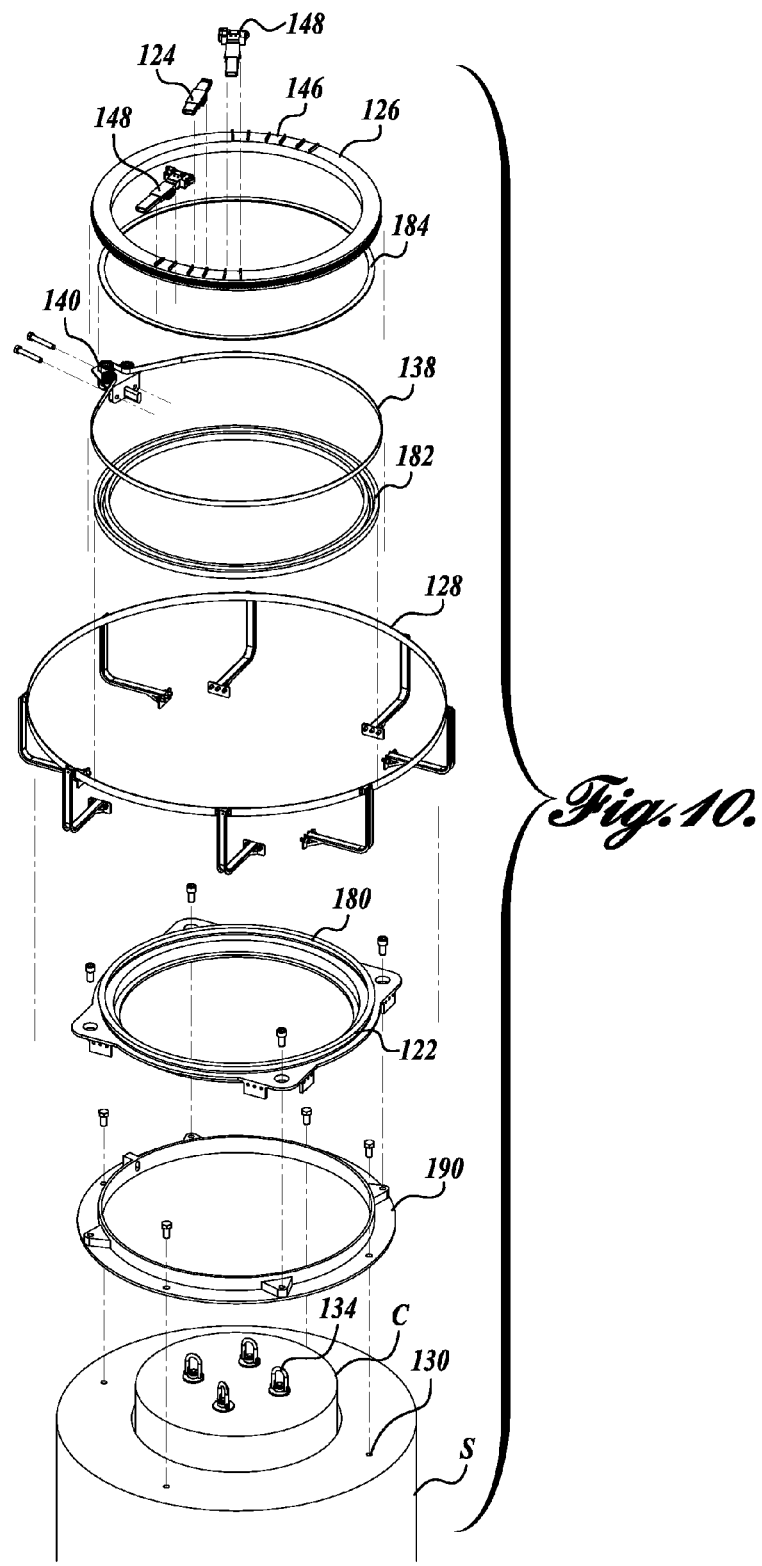

Referring now to FIG. 8, a back weld inspection will be described. The back weld B is the circular weld between the back closure portion of the container C and the cylindrical sidewall of the container C. The back weld B can be inspected by pulling the canister C completely forward in the module M such that the travel system 20 is generally aligned with the canister C back weld B, as can be confirmed by operator visual inspection or by a sensing device. After canister C adjustment, the sensing device 24 and preparation devices 48 can be finely articulated and adjusted to meet the back weld B on the canister C using, for example, articulation controls.

After adjustment, the actuation assembly 36 can be used to rotate the base ring 26 (on which the exemplary sensing device 24 and preparation devices 48 are mounted) relative to the canister C around the entirety of the back weld B. Depending on the sensor used by the sensing device 24, the preparation devices 48 may clean the back weld B surface before sensing or they may apply and remove a solution necessary for inspection. As discussed above, the travel system 20 may also support repair tools, in addition to preparation and examination tools, for the back weld B in any suitable combination.

Referring now to FIGS. 9-12, another embodiment of the present disclosure will now be described. The embodiment shown in FIGS. 9-12 is substantially similar to the embodiment of FIGS. 1-8, except for differences regarding the vertical orientation of the canister C and the storage silo S. Like parts in FIGS. 9-12 use like numerals as used in FIGS. 1-8 in the 100 series.

In the illustrated embodiment of FIGS. 9-12, the storage silo S is a vertical storage silo. Therefore, the travel system 120 is attached to the top entry point of the module S using embedments 130 that are provided for top plate attachment. The travel system 120 further includes a cage 128 for protecting components of the system 20 from damage and also may be used for supporting control and power cables 142. Vertical storage systems typically include a gate or mating mechanism located between the vertical silo and the transfer cask. It should be appreciated that the travel system may be placed either below or above a mating mechanism, and that the cage 128 may be interrupted to clear the mating mechanism. In addition, the travel system 120 includes an adaptor 190 such that support structure 122 is attachable to embedments 30 on silo S.

Figure 11:
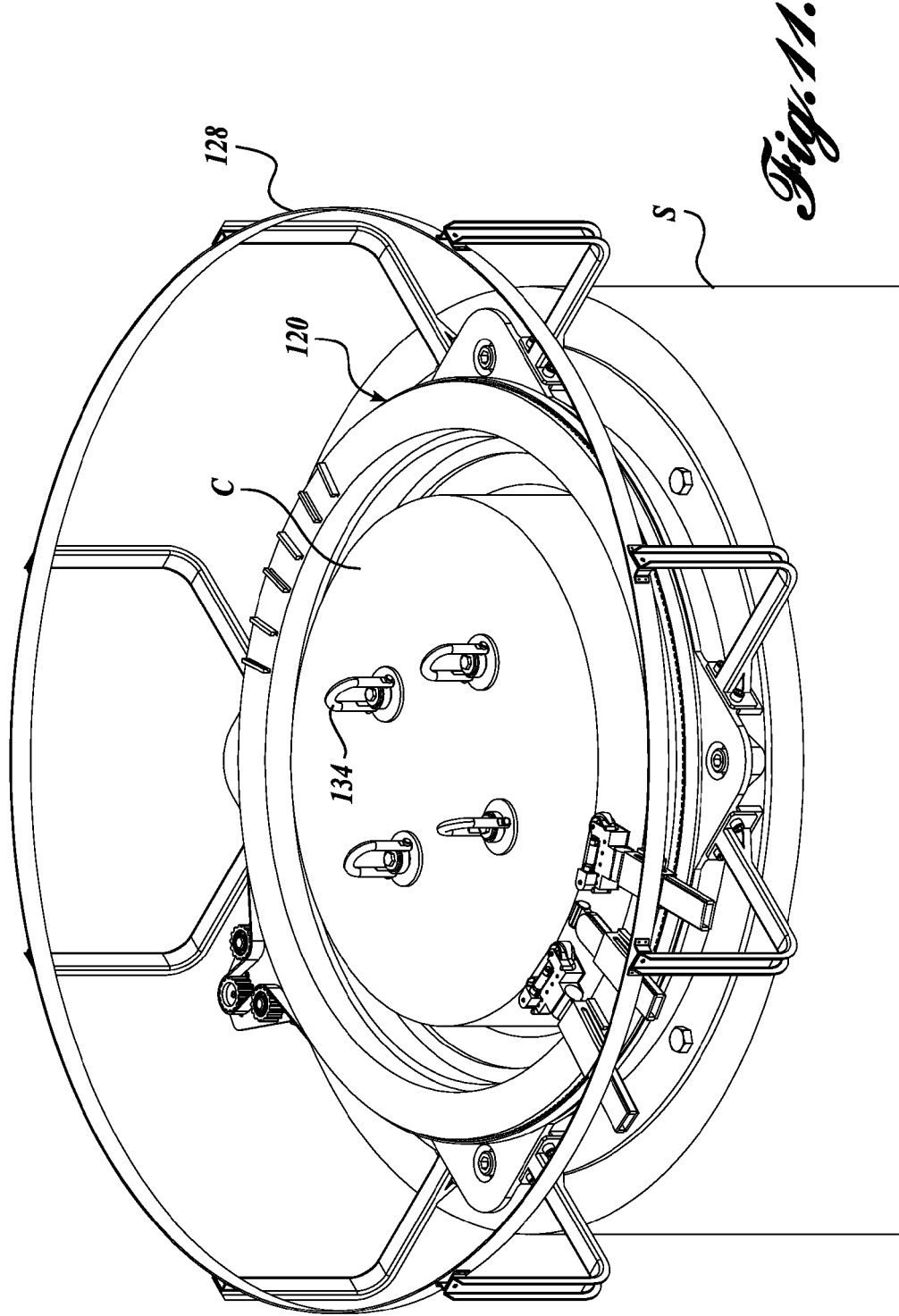

Similar to the embodiment of FIGS. 1-8, the travel system 120 shown in FIGS. 9-12 is designed to prepare, inspect, and repair canisters C, which may be subject to front, longitudinal, and back weld review (see, for example, FIGS. 11 and 12). However, with the embodiment of FIGS. 9-12, the canister C is lifted from the vertical module S using hooks 134, instead of being move horizontally as shown in the embodiment of FIGS. 1-8.

While illustrative embodiments have been illustrated and described, it will be appreciated that various changes can be made therein without departing from the spirit and scope of the disclosure.

The embodiments of the disclosure in which an exclusive property or privilege is claimed are defined as follows:

1. A method of preparing, inspecting, and/or repairing a canister containing radioactive material in a canister storage system, the method comprising:
   (a) mounting a travel system on a surface of a fixed canister storage module configured for storage of only a single closed canister containing radioactive material, wherein the canister storage module is an overpack designed for storage of the canister, wherein the travel system includes a support structure, at least one traveling device, and a base for supporting the traveling device and providing for rotational movement of the traveling device relative to the support structure, wherein the surface of the module includes an opening to a containment area of the module, and wherein the travel system is mounted on the surface of the module such that the base is aligned with the opening;
   (b) rotating the base and the traveling device relative to the support structure and a fixed canister and moving the base to move the positioning of the traveling device relative to the support structure to travel along a circumferential path of the cylindrical body of the canister; and
   (c) fixing the base and moving the canister relative to the fixed base and the traveling device.

2. The method of claim 1, wherein the module is one of a horizontal canister storage module or a vertical canister storage silo.

3. The method of claim 1, wherein the at least one traveling device is selected from the group consisting of a sensing device, a preparation device, and a repair device.

4. The method of claim 3, wherein the sensing device is a non-destructive sensing device.

5. The method of claim 3, wherein the sensing device is selected from the group consisting of dye penetrant sensors, ultrasonic examination sensors, eddy current examination sensors, laser ultrasonic examination sensors, and visual inspection sensors.

6. The method of claim 3, wherein the repair device is selected from the group consisting of grinders, welding heads, abrasive nozzles, peening nozzles, surface coating spray nozzles, and surface cleaning spray nozzles.

7. The method of claim 1, mounting the at least one traveling device on the base in one or more mounting positions.

8. The method of claim 1, wherein the travel system includes a plurality of traveling devices.

9. The method of claim 8, wherein traveling devices may be positioned about 180 degrees from each other on the base.

10. The method of claim 1, moving the traveling device in multiple degrees of movement freedom relative to the support structure.

11. The method of claim 1, moving the traveling device along a weld on the canister.

12. The method of claim 1, further comprising actuating the travel system using an actuation system.

13. The method of claim 12, wherein the actuation system includes a timing belt driven by a stepper motor.

14. The method of claim 1, further comprising moving the base relative to the support structure using a bearing system.

15. The method of claim 14, wherein the bearing system includes a guide ring, an external bearing ring assembly, and an internal bearing ring assembly.

16. The method of claim 1, further comprising moving the traveling device in multiple degrees of freedom relative to the base, including forward and back movement relative to the base, radial rotation relative to the base, and pivotable movement relative to the base.

17. A method of preparing, inspecting, and/or repairing a canister containing radioactive material in a canister storage system, the method comprising:
   (a) mounting a travel system on a surface of a fixed canister storage module configured for storage of only a single closed canister containing radioactive material, wherein the canister storage module is a horizontal canister storage module comprising an overpack designed for storage of the canister, wherein the travel system includes a support structure, at least one traveling device, and a base ring for supporting the traveling device and providing for rotational movement of the traveling device relative to the support structure, wherein the surface of the module includes an opening to a containment area of the module, and wherein the travel system is mounted on the surface of the module such that the base ring is aligned with the opening, and moving the traveling device in multiple degrees of freedom relative to the base ring, including forward and back movement relative to the base ring, radial rotation relative to the base ring, and pivotable movement relative to the base ring;
   (b) rotating the base ring and the traveling device relative to the support structure and a fixed canister; and
   (c) fixing the base ring and moving the canister relative to the fixed base ring and the traveling device.

18. A method of preparing, inspecting, and/or repairing a canister containing radioactive material in a canister storage system, the method comprising:
   (a) mounting a travel system on a surface of a fixed canister storage module configured for storage of only a single closed canister containing radioactive material, wherein the fixed canister storage module is an overpack designed for storage of the canister, wherein the travel system includes a support structure, at least one traveling device, and a base ring for supporting the traveling device and providing for rotational movement of the traveling device relative to the support structure, wherein the surface of the module includes an opening to a containment area of the module, and wherein the travel system is mounted on the surface of the module such that the base ring is aligned with the opening;
   (b) moving the canister from a stored position in the module to a protruding position, wherein at least a portion of the canister protrudes from the opening of the module;

(c) rotating the base ring and the traveling device relative to the support structure and a fixed canister and moving the positioning of the base ring and the traveling device relative to the support structure to travel along a circumferential path of the cylindrical body of the canister, wherein the traveling device is a preparation device;

(d) rotating the base ring and the traveling device relative to the support structure and a fixed canister and moving the positioning of the base ring and the traveling device relative to the support structure to travel along a circumferential path of the cylindrical body of the canister, wherein the traveling device is a sensing or repairing device;

(e) fixing the base ring and moving the canister relative to the fixed base ring and the traveling device, wherein the traveling device is a preparation device; and (f) fixing the base ring and moving the canister relative to the fixed base ring and the traveling device, wherein the traveling device is a sensing or repairing device.

* * * * *